CONTINUOUS MODE-CHROMATOGRAM PRODUCED
WITH LABORATORY TYPE FAST RESPONSE RECORDER

FIG. 12A

BAR GRAPH PRODUCED WITH
SLOW RECORDER
(THREE CONSECUTIVE ANALYSES)

INVENTOR
RICHARD KIESELBACH

BY Harry J. McCauley

ATTORNEY

FIG.10 — INVENTION (1/2-METER COLUMN)

FIG.9 — COMMERCIAL (2-METER COLUMN)

FIG.11 — INVENTION (1/2-METER COLUMN)

United States Patent Office 3,299,693
Patented Jan. 24, 1967

3,299,693
GAS CHROMATOGRAPHIC ANALYSIS
CONTROL APPARATUS
Richard Kieselbach, West Chester, Pa., assignor to E. I. du Pont de Nemours and Company, Wilmington, Del., a corporation of Delaware
Filed Dec. 4, 1963, Ser. No. 327,987
4 Claims. (Cl. 73—23.1)

This invention relates to gas chromatographic analysis, and particularly to a control apparatus for a gas chromatographic analyzer incorporating programming facilities mutually accommodating read-out and the progression of the analysis.

The wide potential application of gas chromatographic analysis techniques has stimulated extensive research in chromatographic separation as a mechanism, so that columns and accessory apparatus designed in the light of current knowledge can provide markedly improved analytical resolution, speed, and sensitivity; however, signal read-out has not been improved commensurately, thus nullifying, to a large measure, practical advance in the art. This is particularly true as regards industrial process chromatographic analyzers which, for fullest realization of benefits, should be automated, at least in part.

An object of this invention is to provide an improved control apparatus for gas chromatography which brings read-out to a level of technological advance matching modern gas chromatographic separation per se. Other objects of this invention are the provision of a control apparatus for gas chromatography which utilizes a single span selection network for shared use in the analysis of a multiplicity of components, one which incorporates memory facilities for the retention of component concentration indicia long past the high speed development of the corresponding peaks within the chromatographic analyzer column, and one which exerts a control over the chromatographic separation itself in order to effect a general time accommodation with concurrent read-out operations. Yet another object is the provision of a chromatographic read-out apparatus of rugged design adapted to withstand the rigors of industrial service, and one which is relatively low in first cost and maintenance. The manner in which these and other objects of this invention are attained will become clear from the following detailed description and the drawings, in which:

FIGS. 12A and 12B show chromatograms obtained by the use of this invention on the same 9-component mixture using a 0.1 cc. sample and a ½-meter gas chromatographic column provided with well-designed accessory apparatus, as to which

Generally, this invention is a control apparatus for a gas chromatographic analyzer provided with means for regulating elution rates comprising, in combination, an analysis programming device effectuating the sample chromatographic analysis cycle in progression from sample input through elution stripping of segregated components, an electrical readout circuit responsive to the column effluent concentration detector of the chromatographic analyzer having, in series connection with the concentration detector, a signal span selection network, a voltage amplifier, a peak detector and a peak waveform recorder parallel-connected with the peak detector, and means responsive to the peak detector superposing application by the programing device of a programmed corrective action regulating the rate of the elution stripping to maintain disposition of a chosen analysis peak as time-synchronizing reference within predetermined time bounds with respect to the operational cycle of the electrical read-out circuit.

Figure 1A:
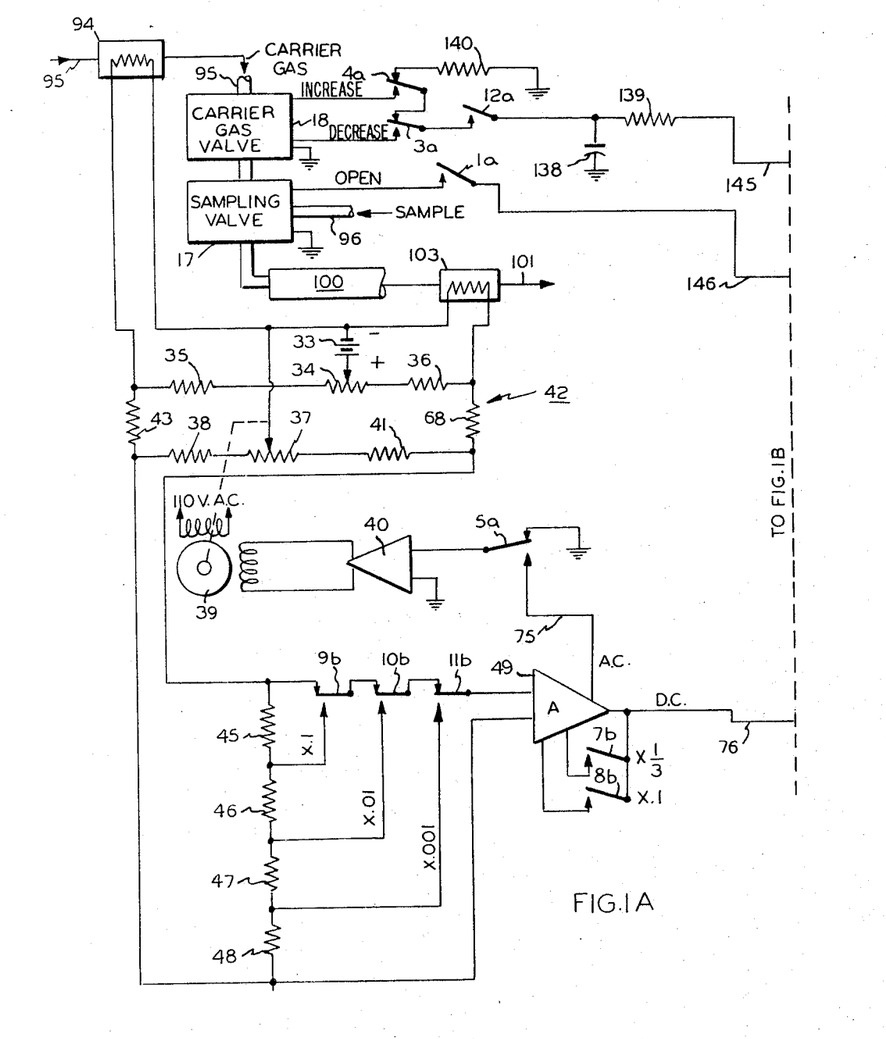
FIGS. 1A, 1B and 1C taken together constitute a schematic diagram of a preferred embodiment of this invention shown complete with a trend measuring-recording auxiliary, the FIG. 1A representation of the analyzer column itself being fragmentary in order to simplify the showing.

Referring to FIG. 1A the associated chromatographic analyzer with reference to which this invention is explained is designed in accordance with the most recent published advances in column operation and concentration detection and incorporates the gas chromatographic separation column 100, shown only fragmentarily, which discharges into exhaust pipe 101 along a course indicated generally by the flow line drawn with directional arrows. The carrier gas for column 100 is supplied via pipe 95, within which is disposed a thermistor 94, through a constantly open carrier gas flow regulation valve 18 connected in series with a sample injection valve 17, obtaining its sample from line 96. Valve 18 is a fine adjustment stepper valve of conventional design, preferably an adjustable Bourdon restrictor type, because of its exceptional ability to maintain a very small restriction at precise size; however, a fine needle valve is also suitable. The valve embodies a pair of solenoids, preferably of the rotary type, independently driving the flow-restricting element through suitable gears and ratchets. Application of an electrical impulse to the particular solenoid effecting valve opening causes the valve to open a small fixed increment, or step, whereas an impulse applied to the other solenoid closes the valve an equal increment, or step. The segregated discharge of separated components is detected by the usual thermal conductivity bridge, denoted generally at 42, one arm of which is thermistor 103 disposed within conduit 101 exhausting the stream of exiting gas.

Bridge 42 can be of the design taught in U.S. Patent 3,080,745, incorporating a power source 33, typically, 47 v. D.-C., although this is by no means critical, 40–50 v. being a satisfactory range. The positive terminal of the source is connected to the tap of potentiometer 34 (typically 500 ohms range) to either side of which are connected resistors 35 and 36 (typically 4K ohms each) completing the circuit to corresponding sides of each of the thermistors 94 and 103, respectively, thereby providing a manual current trim network.

The negative terminal of source 33 is connected to the remaining sides of thermistors 94 and 103, and also to the tap of automatically balanced potentiometer 37, to either side of which are connected resistors 38 and 41 (each typically 50K ohms), completing the circuit to the separate thermistors via individual resistors 43 and 68 (each typically 500 ohms). It is usually desirable to provide a manual coarse zero control network connected in shunt across the network consisting of resistor 38, potentiometer 37 and resistor 41; however, this is omitted from the circuit for simplicity in the showing. Bridge 42, together with its appurtenances, is collectively referred to hereinafter and in the claims as the "concentration detector."

Figure 1B:
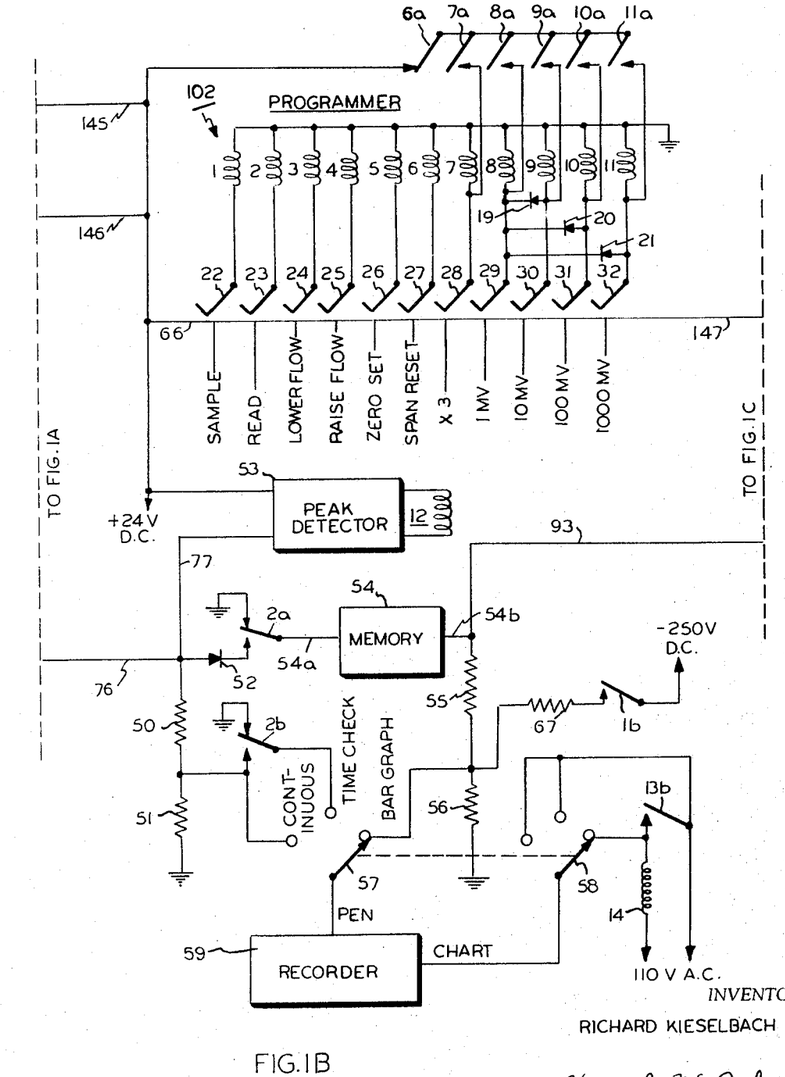

Turning now to the controller of this invention, cyclic analysis control is obtained by the use of a programming device, indicated generally at 102, FIG. 1B, which in the design detailed, embodies a multiplicity of parallel-connected relays 1 through 11, inclusive, grounded on a common side and selectively connected to power (typically, +24 v. D.-C.) through stationary individually movable contact fingers 22–32, respectively, completing electrical circuit with comon terminal plate 66. In FIG. 1B all contact fingers are shown in unactivated, or open-circuit, representative.

For purposes of description solely, programmer 102, in a preferred embodiment of selective circuit maker-breaker, utilized a circular paper chart 130 (refer FIG. 2, on same sheet with FIGS. 12A and 12B) interposed between fingers 22–32 on the one hand and plate 66 on the other, which was clamped at its center on a power-driven rotatable metal hub 131 and thereby carried around with it at constant angular velocity. The chart was cut away along concentric arcs, such as 132 and 133, having lengths proportioned to the time intervals during which it was desired to maintain a given relay circuit closed by intrusion of its associated contact fingers 22–32, respectively, through an underlying slot in the chart and against plate 66. The slots were angularly spaced in concentric circular array, each within its specific "channel," reserved, as shown by the printed designations of FIG. 2 for the individual operations indicated, and each spaced radially from hub 131 at different distances one from another. Accordingly, by preselecting the angular spacing, the desired time sequence of relay 1–11 operation ensued as each given slot of the chart presented itself in turn across the contact finger-terminal plate inter-space during chart rotation, one 360° rotation, or a unitary fraction thereof, as desired, constituting a complete analysis cycle. It will be understood that each programing chart 130 is prepared in advance of the analysis involved. A wide variety of analyses can thus be accommodated readily by merely providing a repertory of individual programs cut to the requirements of each. It will, of course, be apparent that many different designs of programming device are suitable for the purposes, including, if desired, drum memory apparatus and auxiliaries of the constructions conventional in the data-handling arts, and the like.

The objectives of the individual programming circuit operations are denoted by the legends below each of the relay contacts 22–32 in FIG. 1B, the order of contact arrangement not conforming to the time sequence in which the individual operations are made to occur.

The first operation in the analysis sequence is that of sample introduction, and this is brought about by energization of relay 1 solely, effected by punching a hole in the "Sample" channel 134 (FIG. 2) of the programming chart, i.e., in circumferential sweep path with contactor 22, which thereupon completes the electrical circuit with common terminal plate 66. The operation of sample introduction establishes "time zero," i.e., the reference point in time to which all subsequent programming operations are chronologically related. The duration of the sample introduction interval is determined by the length of the circuit-making slot cut in the paper chart, typically, $\frac{1}{2}''$, which, at a chart rotational speed of one rev./min. for the sample channel, was equivalent to one sec.

Paper chart programming has proved to be economical and of a precision capability permitting the easy accommodation of a multiplicity of operations following one another in rapid succession. As an example, with a circumference of "Read" channel on chart 130 equal to 28'', slots can be punched to a precision of $\frac{1}{32}''$, corresponding to a timing error of not more than one part in 896, or, approximately, ±0.1%. Thus, in a typical one min. duration analysis cycle, this error corresponds to only 0.06 sec. In contrast, prior art devices which employ cam-actuated switches for effecting cycle control operations necessitate extreme care in cam position adjustment to achieve even ±1% precision. It is possible to substitute moving tapes for the achievement of improved precision; however, this is disadvantageous in that expensive complex photoelectric or magnetic detection of tape signals is then required. Precision in timing is of vital importance, as will become apparent from a consideration of the examples hereinafter set forth, in which peaks occur separated by less than one second of time.

Relay 1 has three sets of normally open contacts, namely, 1a (FIG. 1A), 1b (FIG. 1B) and 1c (FIG. 1C), the first set of which, i.e., 1a, on closing establishes the power supply via lead 146 to normally closed, solenoid-actuated sampling valve 17, which thereupon injects a predetermined amount of the sample to be analyzed from line 96 into the carrier gas continuously supplied to analyzer column 100 via open carrier gas valve 18 connected to carrier gas supply line 95. Relay 1 is then de-energized and the chromatographic separation upon which analysis depends ensues, this typically requiring a time duration of between about 15 and 300 secs., depending upon the nature of the sample.

It is desirable to verify the fact that the concentration detector bridge is in balanced, zero output state at the beginning of each read-out cycle, and this is effected by zero set relay 5 (FIG. 1B), which can be selectively energized at any time that no gases in analysis (i.e., exclusive of carrier gas) are being exhausted from column 100 through pipe 101 by presenting a cut-away in the paper chart aligned with contactor 26 as the next operation in sequence after sample input. Relay 5 has only one set of contacts, i.e., 5a (FIG. 1A), normally grounded as shown but transferred, under energization, to lower position completing the electrical circuit with amplifier 49. Amplifier 49 is a chopper-type, D.C. amplifier provided with feedback range selection through the use of independent negative feedback loops inclusive of normally open contacts 7b and 8b, respectively. Such amplifiers are generally conventional for use in self-balancing potentiometers (refer "Electronics for Scientists" by Malmstadt, Enke and Toren, publisher W. A. Benjamin, Inc., New York (1962), pp. 267–269, inclusive). The instant design is basically a modification taught by P. C. Hoell in "Review of Scientific Instruments," vol. 29 (1958), p. 1120, embodying a pair of choppers. Thus, amplifier 49 permits the withdrawal of an amplified A.-C. signal ahead of the second chopper and an amplified D.-C. signal as a result of demodulation by the second chopper. The maximum gain of the amplifier is, typically, $5 \times 10^5$, thus providing a 50 v. output for a 0.1 mv. input.

The input to amplifier 49 is any D.-C. voltage existing across potentiometer 37 (and its associated end resistors 38 and 41), the terminals of which are connected to the amplifier through the span selection network having switch contacts 9b, 10b and 11b, all normally closed as shown in FIG. 1A which corresponds to zero attenuation by the span selection network. Any A.-C. signal from amplifier 49, corresponding to unbalanced condition of potentiometer 37, passes through lead 75 and contacts 5a to power amplifier 40. Motor 39 is a 2-phase servo motor having one winding powered from conventional power amplifier 40 and the other from 110 v. A.C., so that it automatically adjusts the tap of potentiometer 37 to a position of zero output through the mechanical connection indicated in broken line representation. The paper programming chart 130 is preferably cut with a substantial length opening 132 (FIG. 2) in the zero set channel to insure closure of contacts 5a over an interval of about one second duration, in order to accommodate any large magnitude corrections in zero set, should these be necessary.

The next chronological step in operation is the span selection programmed for the next-to-exit component in analysis, relays 6 through 11 collectively being reserved for this function. (In this connection the legends of signal voltage magnitude under each of the several relay contacts, FIG. 1B, are those for a specific design of apparatus, whereas the attenuation factors hereinafter given for the span selection network are general in nature; nevertheless, the relationship between pairs is evident).

As shown in FIG. 1A the common span selection network utilized on a time-shared basis by all of the components in analysis is a selective attenuation network which functions by interposition of preselected values of resistance in the signal output circuit from the concentration detector. Thus, there are provided four individual resistors 45, 46, 47 and 48, typically having resistance values of 18000, 1800, 180 and 20 ohms, respectively, series-connected and individually shunted through relay contacts 9b, 10b and 11b, respectively, to the input side of amplifier 49. With the specific circuit described, transfer of relay contact 9b to its lower position attenuates the output of the peak sensor by a factor of 10, as indicated by the "x" factor denoted adjacent the shunt connection around resistor 45, whereas similar transfer of contact 10b attenuates the output by a factor of 100 and contact 11b by a factor of 1000. Additional flexibility in signal attenuation is provided by the individual feedback loops inclusive of contacts 7b and 8b, hereinbefore described, which, on transfer to the lower positions shown, operate to reduce the gain of amplifier 49 by factors of 3 and 10, respectively.

The selective attenuation provided by the span selection network requires interlocking of relay operation and, accordingly, as shown in FIG. 1B, the relay pairs 8–9, 8–10 and 8–11 are interconnected through diodes 19, 20 and 21, respectively, so that the designated relay pairs are energized simultaneously whenever the higher-numbered one of a pair is switched to closed-circuit state by intrusion of its respective contactor 30–32 through an aligned slot punched in the programming chart. All diodes employed in my apparatus, except diode 52 (FIG. 1B), can typically be silicon, type 1N2071. It will be understood that operation of the relays 7 and 8 is completely independent one of the other, so that either can be operated, or not operated, at will in different combinations, thereby providing a total range of attenuation of 10,000 to 1 in incremental steps of 3 and 10. It is preferred to utilize holding contacts 7a–11a, inclusive, transferred to closed circuit condition by the associated individual relays, to insure positive maintenance of any given span selection and these have, provided in series connection between them and the 24 v. power source, a circuit-clearing contact 6a transferred to open circuit position by energization of span reset relay 6, the operation of which is programmed on the chart via its reserved contact finger 27, with operation scheduled to follow the next-described (read) step of the analysis cycle.

In summary, the span selection network described is adapted to handle any full-scale span running from 0.1 mv. as a minimum, in the specific design described, with zero attenuation, i.e., with all of the relays 6–11, inclusive, deenergized, up to 1000 mv., as constrasted with a lower limit span of 5–10 mv. conventional in prior art chromatographs. Moreover, span selection is effected economically by the use of a single network shared in turn by all of the components in analysis collectively, and, of at least equal importance, with greatly improved sensitivity as a result of the marked reduction in the potential number of interfering thermal E.M.F.'s contributed by individual attenuating resistors, where such resistors are reserved exclusively to a single component, as has heretofore been the usual practice.

The advantage of shared use of a common signal attenuation network by elimination of individual switches, attenuators and associated components is particularly evident in the analysis of complex mixtures wherein the percentage concentrations of large numbers of sample components, typically, twenty or more, is sometimes desired.

Figure 1C:
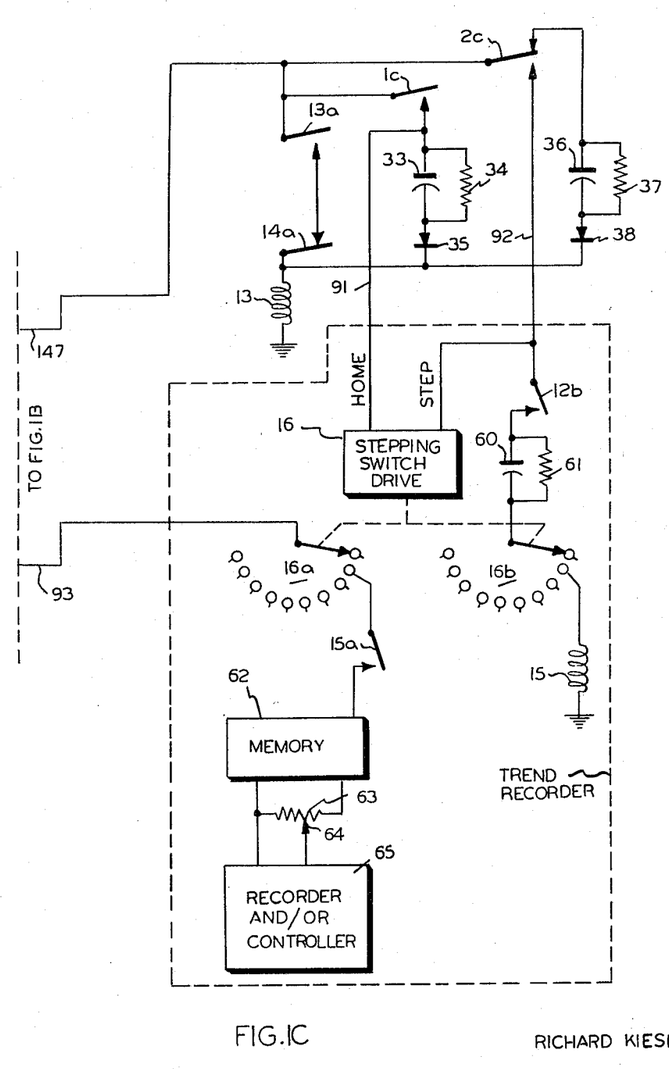

The next cycle operation is the reading of the magnitude of an individual component exiting through exhaust 101 past thermistor 103. The "Read" channel is that in line with contact finger 23 in series electrical circuit with relay 2, provided with the relay contacts 2a, 2b (both FIG. 1B) and 2c (FIG. 1C). The read step entails the accomplishment of two completely unrelated actions, one of which is peak detection, that is, a transient quantitative response to the electrical peak signal generated by the concentration detector as a function of the amount of analyzed component eluted from chromatographic separation column 100, and the other of which is the retention in memory of an electrical equivalent of this same peak signal, if a memory is utilized as hereinafter described. Both actions can be effected simultaneously by parallel response to the D.-C. output from amplifier 49 via lead 76.

Figure 3:
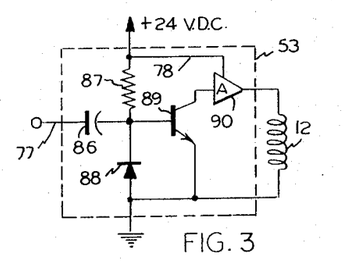
FIG. 3 is a schematic circuit diagram of a preferred embodiment of peak detector employed with the apparatus of FIGS. 1A–1C.
Figure 9:
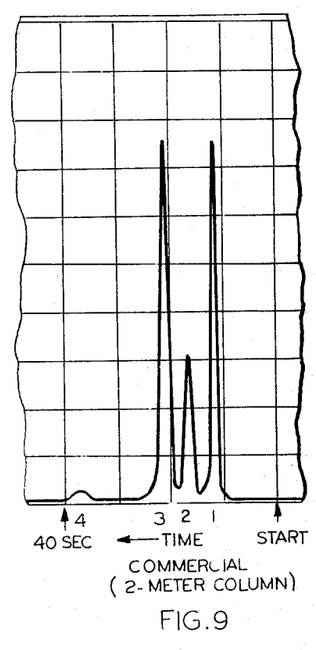
FIG. 9 is a typical chromatogram run made with a 2-meter gas chromatographic column supplied in a commercial high-speed chromatograph (not using the apparatus of this invention)
Figure 10:
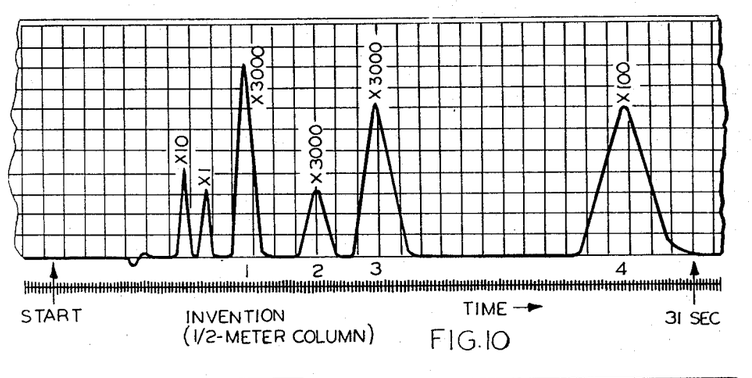
FIG. 10 is a typical chromatogram run made with a ½-meter gas chromatographic column and the same sample analysis as employed for the FIG. 9 run, but utilizing well-designed accessory apparatus and a controller according to this invention.
Figure 11:
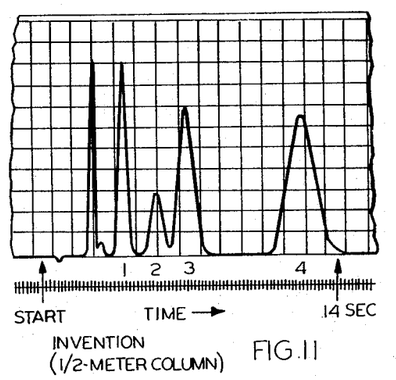
FIG. 11 is a typical chromatogram run made on the same ½-meter gas chromatographic column as used in the FIG. 10 run and on the same sample analysis as employed in the FIG. 9 run, but utilizing a controller according to this invention and an increased carrier-gas flow rate.

Turning first to the transient peak detection, a suitable design of peak detector, indicated generally at 53, FIG. 1B, is that shown schematically in FIG. 3 (on same sheet with FIGS. 9–11). This detector is coupled to the chromatograph signal output transmitted through lead 76 and sub-lead 77 by capacitor 86, which typically has a capacitance of 2 μf., the other side of the capacitor being connected to the base element of N-P-N transistor 89, which can be a silicon type 2N2219. The collector of transistor 89 is connected to the input side of amplifier 90, typically a direct-coupled, 2-stage transistor amplifier, which delivers its output to the coil of relay 12, completed in circuit by connection to ground. Diode 88 is shunted across the base-emitter circuit of transistor 89 via the circuit conductor connecting the transistor base with capacitor 86, and a resistor 87 of typically 22 megohms value is connected between the transistor base and the +24 v. D.-C. source, which latter also provides operating voltage to amplifier 90 via lead 78.

The operation of the peak detector is as follows. The concentration detector generates a steadily rising voltage responsive to an eluated component and the resulting rising signal voltage delivered by amplifier 49 charges capacitor 86. However, the output of transistor 89 remains temporarily unaffected, due to the biasing of resistor 87 connected to the +24 v. source. An instant after the concentration detector signal reaches its peak and begins to fall, current supplied through resistor 87 flows into capacitor 86, thus removing the forward bias from transistor 89, which thereupon allows the collector voltage of the transistor to rise. Amplifier 90 amplifies this rising voltage and thus energizes relay coil 12 at substantially the same instant in time as that of peak existence. As the concentration detector signal returns to zero, capacitor 86 discharges through diode 88, while continuing to maintain transistor 89 in its cut-off state. When the signal has returned to zero, current flow to capacitor 86 ceases, and current from resistor 87 again flows into the base-emitter circuit of transistor 89, resulting in deenergization of relay 12, and return of the peak detector to its original state preparatory to repetition of the peak detection cycle. Relay 12 in the design described has two contacts, the first of which is 12a (FIG. 1A) connected in series between the actuation voltage and an individual one of the two solenoids of carrier gas valve 18, not detailed, through one of a pair of parallel-connected contacts 3a, decreasing flow, and 4a, increasing flow, selectively actuated by programming chart 130 as hereinafter described, and 12b (FIG. 1C) in the trend recorder auxiliary, if such an auxiliary is employed.

The memory, indicated generally at 54, FIG. 1B, receives its input from lead 76 via diode 52, which is preferably a low-leakage type (e.g., an FDG–382), when the "read" relay 2 transfers contact 2a to its lower position, as occurs during the read step. Memory 54 can consist simply of a capacitor shunted by an electrometer circuit, as hereinafter described, providing the output connection via lead 54b to the voltage divider made up of series-connected resistors 55 and 56 (typically, 98,000 ohms and 2,000 ohms, respectively). Thus, with contact 2a transferred to its lower position the capacitor of memory 54 holds its charge indefinitely, since there can be no leakage back through diode 52 and the electrometer inhibits any charge drain in the opposite direction. Accordingly, memory 54 holds the electrical equivalent of an elution peak evaluated by the concentration detector for any given time interval programmed as the duration of the "read" step of the analytical cycle, affording the recorder ample time to accomplish its function. This is necessary, because modern chromatographic analyzers can clear peaks with great rapidity well in excess of the limiting response time of commercially available industrial type recorders suitable for chemical plant use, and, without a memory, no matching of the two is possible. At the termination of the "read" step, contact 2a returns to its upper position discharging the memory capacitor to ground, thereby restoring memory 54 to its initial state preparatory to accomplishment of the next succeeding read-out.

Figure 4:
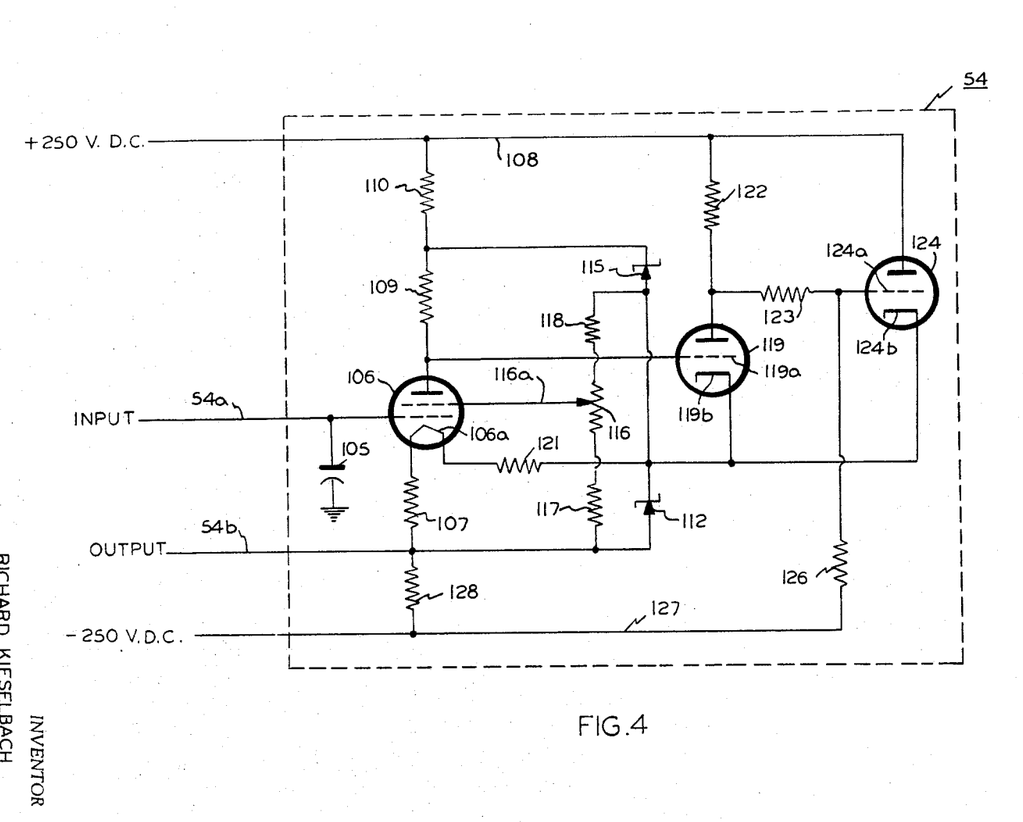
FIG. 4 is a schematic circuit diagram of a preferred design of memory device used in the apparatus of FIGS. 1A–1C.

A suitable design of memory 54 is detailed in FIG. 4, and consists of a capacitor and a 3-stage electronic amplifier which is adapted to supply an external load in circuit with lead 54b drawing appreciable current and producing an output signal having a potential exactly equal to that of a source (i.e., input lead 54a and its associated capacitor 105), while drawing no power from the source.

The memory element of the apparatus is capacitor 105 (typically, 0.1 mfd.) connected between lead 54a, running to the grid of filamentary cathode input tube 106 (typically a type CK 5886), and ground. The output is drawn via lead 54b, connected with cathode resistor 107 (typically, 220 ohms), the circuit from the positive voltage bus 108 (typically, +250 v. D.-C.) to the anode of tube 106 being completed through series-connected resistors 109 and 110 (typically, 2.7 megohms and 47K ohms, respectively).

A pair of series-connected Zener diodes 112 and 115 (typically, IRC Type 1N716A) is connected in shunt between output lead 54b and a point between resistors 109 and 110, and a potentiometric network consisting of tapped potentiometric section 116 (typically, 25K ohms span) series-connected between fixed resistors 117 and 118 (typically, 47K ohms and 22K ohms, respectively) is connected to lead 54b in shunt around Zener diode 112. The tap 116a of potentiometric section 116 is connected to the screen grid of tube 106, and the anode of tube 106 is direct-coupled to the grid 119a of triode 119 (typically, one section of a dual triode Type 12 AU7, the second section of which is utilized as hereinafter described), the cathode 119b of which is connected to a point intermediate Zener diodes 112 and 115 and thence in series with the filamentary cathode 106a of input tube 106 through resistor 121 (typically, one K ohm). The anode of triode 119 is connected to bus 108 through resistor 122 (typically, 220K ohms) and is coupled through resistor 123 (typically, 470K ohms) to the grid 124a of the cathode follower triode 124 (typically, the second section of the Type 12 AU7 hereinbefore described), resistor 126 (typically, 2.2 megohms) connected from a point between resistor 123 and grid 124a to negative voltage bus 127 (carried at the same voltage magnitude but opposite polarity, i.e., −250 v., from bus 108), providing a voltage dividing action establishing a preselected negative bias for grid 124a relative to cathode 124b. The anode of triode 124 is connected directly to positive bus 108, whereas its cathode 124b, is connected to cathode 119b and, via Zener diode 112, to load resistor 128 (typically, 15K ohms) connected between output lead 54b and negative bus 127.

Briefly, the operation of memory 54 is as follows: It is well known that a vacuum tube draws minimum current (i.e., grid current of tube 106) from a single source when its interelectrode potentials are maintained at constant low values. This is accomplished for tube 106 with the circuit parameters detailed, in that the cathode-to-anode voltage is at about 8 v. level when the anode current is held at the constant low value of, typically, 6 $\mu$a., and when the grid is biased negatively with respect to cathode 106a at a constant optimum voltage of, typically, about 2 v., as here. It is further desirable to operate the cathode 106a at a constant current (typically, 10 ma.) lower than the usual practice with receiving tubes, to thereby minimize the grid current and also inhibit changes in tube characteristics with age.

The current circuit for input tube 106 from positive bus 108 to negative bus 127 is via resistors 110, 109, the tube itself, and resistors 107 and 128, all in series. The parallel circuit made up of Zener diodes 112 and 115 maintains a constant voltage drop (in this case about 24 v.) across input tube 106, and its associated anode and cathode resistors, 109 and 107, respectively, regardless of current flow, and this anode supply voltage remains constant and independent of varying input signal magnitudes as well as primary power supply voltages. The parallel Zener diode circuit simultaneously maintains the adjacent terminal of filament 106a at a 2 v. positive potential relative to output lead 54b by the clamping action of Zener diode 112 applied through dropping resistor 121. In addition, the potentiometric network inclusive of section 116 and its tap 116a permits co-ordinated preselection of the potential applied to the screen grid of input tube 106, the regulability secured by tap adjustment providing accommodation to different individual Zener diodes, or tubes 106, on replacement or substitution. It will be understood that a characteristic of multi-grid tubes such as that represented by tetrode 106, is that the control grid voltage necessary to produce a given anode current is inversely proportional to the screen grid voltage relative to the cathode. Accordingly, by adjustment of tap 116a, it is possible, within limits, to produce a desired anode current flow through tube 106 at the fixed 2 v. control grid bias, including adjustment of the potential at lead 54b to exactly zero equality with the potential of input lead 54a when no signal is applied to the latter.

Now, if a given potential, which is the electrical equivalent of an elution peak, is introduced into capacitor 105, the potential applied to the grid of input tube 106 also rises with respect to ground. This increases the flow of anode current through tube 106, drawing increased current through load resistor 109 with accompanying drop of the potential existing on the anode of tube 106 relative to filament 106a. Since the anode of tube 106 is coupled to grid 119a of tube 119 and filament 106a is coupled to cathode 119b via resistor 121, the voltage drop across which latter is fixed by diode 112, a change in anode potential of tube 106 is exactly reflected by a change in the potential of grid 119a relative to cathode 119b, diode 112 and resistor 121 together providing a fixed bias for triode 119.

Reduced grid-cathode potential in triode 119 causes the potential of the triode anode to rise, because of the reduced anode current drawn through resistor 122, resulting in further signal amplification. The anode of triode 119 is coupled to the grid 124a of cathode follower 124 through the voltage divider consisting of resistors 123 and 126, which, at the same time, carries the amplified signal from the anode of triode 119 to grid 124a. It might be mentioned that, while the voltage division reduces the signal amplification somewhat, the signal applied to grid 124a is typically only about 20% less than that of the anode of triode 119, which is negligible as compared to the over-all gain of the circuit.

The potential of grid 124a rises with rise in potential of the anode of triode 119, causing triode 124 to draw more current through its load resistor 128, raising the potential of cathode 124b to follow the potential of grid 124a. However, since cathode 124b is connected to cathode 119b of triode 119, the anode current flow of triode 119 is reduced, further raising the potential of the anode of triode 119. This positive feedback results in effectively infinite gain in triode 119.

Cathode 124b, being coupled to filament 106a via resistor 121, and via diode 115 and resistor 109 to the anode of input tube 106, furnishes 100% over-all negative feedback to tube 106. Consequently, the potential at filament 106a adjacent resistor 121 relative to ground is caused to rise exactly in accordance with a rise in potential applied to the grid of tube 106, raising the potential at output terminal 54b, initially at zero with respect to ground when input terminal 54a was at ground potential, to exact equality with the signal potential carried by capacitor 105.

The composite peak waveform recorder, utilized to record the entire analysis, is represented generally at 59, FIG. 1B, the switching circuit of which is of somewhat special design to enable the obtainment of three different types of charting operation at the option of the user by manual positioning of the ganged pen and recorder switch arms 57 and 58, respectively, at any one of the three switch settings denoted, from right to left, "Bar Graph," "Time Check" and "Continuous," respectively.

Figure 5:
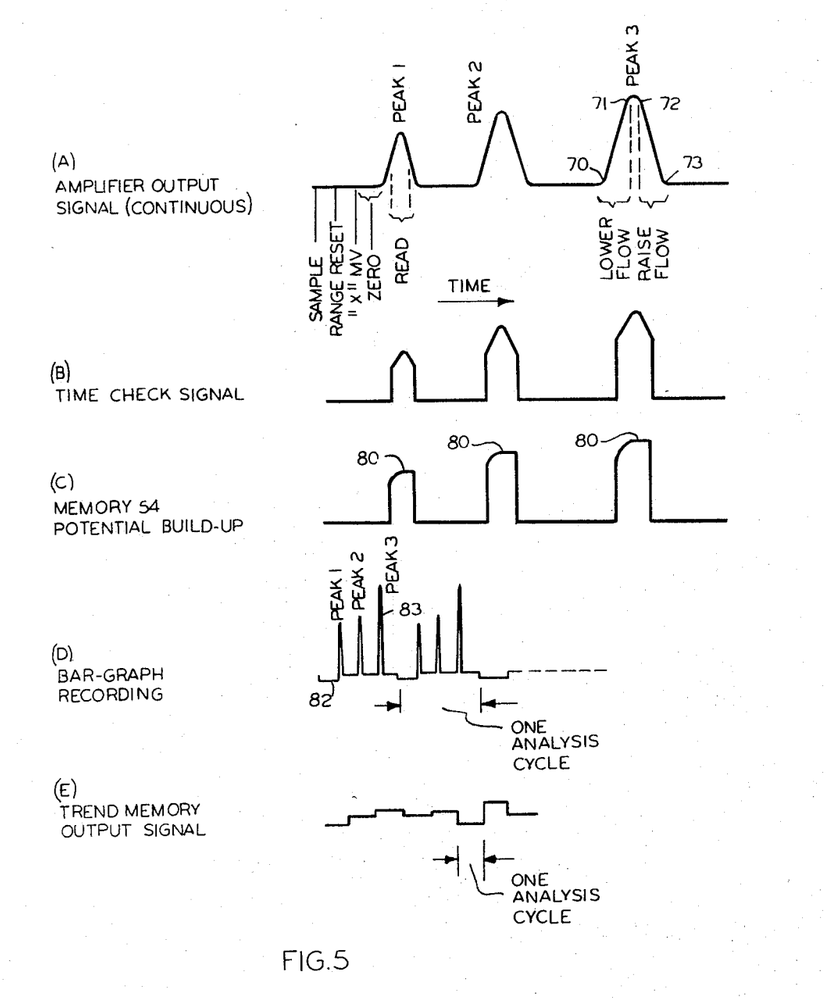
FIG. 5 is a schematic representation of the three most important signal pulses, A, B and C, respectively, utilized in the apparatus of FIGS. 1A–1C as well as two typical analysis records (D and E) obtained with the FIGS. 1A–1C apparatus.

The nature of the several chart recordings can be most readily understood by reference to FIG. 5. It is necessary when setting up an analyzer preparatory to long-term monitoring service, to obtain a visual indication and record of exact concentration detector response as a function of time. This type of record is shown in FIG. 5(A), the successive analysis cycle step locations being related to their individual times of occurrence by the legends written in for the first peak, denoted "Peak 1," only. For this type of recording, continuous connection of the recorder pen direct to the amplified concentration detector output lead 76 is required, and this is effected by manual positioning of switch arm 57 at its left-hand contact, FIG. 1, labelled "Continuous." A voltage divider consisting of resistors 50 and 51 (typically, 98,000 ohms and 2,000 ohms, respectively) is interposed in this circuit. The chart switch arm 58, being ganged to switch arm 57, correspondingly occupies its extreme left-hand position, under which circumstances 110 v. A.-C. is applied continuously to the recorder chart drive, and successive peaks occur at spaced intervals on the recorder chart obtained.

As hereinbefore mentioned, conventional recorders now used with chromatographic apparatus in industrial service lack sufficient pen speed adequately to respond to the rapidly moving peaks, which can typically be of one second or less duration. For the purpose of establishing the quantitative time intervals which must be allocated in preparing a program such as that represented by chart 130, however, quantitative peak height information is not required. Consequently, a relatively slow (e.g., 1-sec. full-scale response) recorder can be employed to record the necessary time interval information by attenuating fast peaks to a small fraction of full-scale recorder response, e.g., 5–10%. Under these conditions, legible recordings of time intervals can be obtained, even though the recordings would be entirely inadequate for the purposes of quantitative analysis.

It is frequently desirable to verify the fact that successive analysis peaks occur in centered relationship to the several "read" step slots 133 punched in the programming chart 130, and this is done by relating the continuous concentration detection to operation of "read" relay 2 by "Time Check" recorder operation. Here pen switch arm 57 is manually moved to its Time Check setting, by which it is connected with voltage divider 50–51 and concentration detector output lead 76 only during the time interval in which contact 2b is transferred to its lower position, FIG. 1B, by energization of "read" relay 2. Again, the chart of recorder 59 is driven continuously by switch arm 58, positioned now at its middle setting. If the several analytical peaks are being evaluated by the concentration detector in exact time synchronism with the presentation of the "read" slots 133 in programmer chart 130 aligned with contact finger 23, the peaks will be centered exactly within the several "read" steps as shown in FIG. 5(B), the vertical front and rear abbreviation of concentration detector sampling under the influence of relay 2 facilitating visual corroboration of the centering. If defective centering is revealed, any incorrectly punched "read" slot in programmer chart 130 can be closed with a gummed label, and a new, correctly positioned slot punched to effect a correction in this respect.

Generally, chromatograph users prefer a bar-graph type recording for sustained monitoring service, such as that depicted in FIG. 5(D), and this is provided by manually positioning pen switch arm 57 and its co-operatively ganged chart counterpart 58 to their right-hand settings of FIG. 1B. Here only brief intermittent actuations of pen and chart are had, so that a very compact recording of long term analysis is possible, with accompanying advantages of economy in chart paper consumption but, more important, with improved convenience of record interpretation over lengthy time periods. Pen actuation in this mode is exclusively responsive to memory 54 during the "read" step, and consists of a single rapid swing of the pen to an ordinate extent proportional to the amount of a given component in analysis, corresponding to the peak value of the electrical equivalent stored in the memory, thereby matching the peak value 80 of memory trace 5(C). Synchronized intermittent movement of the recorder chart is effected by relay 13 and its associated R–C circuits shown in the upper right-hand portion of FIG. 1C.

It is preferred to precede each sample analysis cycle by a brief negative record trace excursion such as 2, FIG. 5(D) in order to provide an indication of the start of a cycle, whereby individual successive bar readings can be related through the order of their occurrence with the sample components which they individually represent. This is conveniently done during the sampling step effected under control of relay 1. At this time contact 1b is transferred to its lower position, closing circuit from a negative voltage source (of any convenient value exceeding recorder span, typically, −250 v. D.-C.) through resistor 67 (typically, 10 megohms) to recorder pen drive 57, producing a slight negative movement of the pen responsive thereto. Simultaneously, contact 1c (FIG. 1C), in circuit with +24 v. D.-C. via lead 147 and plate 66, closes, connecting the R-C circuit made up of capacitor 33 (typically, 0.1 mfd.) in parallel with resistor 34 (typically, 1 megohm) through diode 35 with relay coil 13 and thence to ground. Relay 13 immediately locks its holding contact 13a to maintain its energization and also closes contact 13b (FIG. 1B) to complete the powering circuit to the recorder chart via switch arm 58 and, simultaneously, to time-delay relay 14. Relay 14 has a typical time delay of one sec., after which it breaks the energization circuit of relay 13 by momentarily opening spring-loaded contact 14a. Chart movement occurs only during the brief interval in which contact 13b is closed, thereby producing the brief negative pip 82 preceding the first peak of each analytical cycle.

Identically the same chart advance is procured following the "read" step, this time by reclosure of contact 2c (to its upper position), which contact is otherwise open during the immediately preceding read step. Thus, the R-C circuit made up of capacitor 36 (typically, 0.1 mfd.) parallel-connected with resistor 37 (typically, 1 megohm) through diode 38 with relay coil 13 and thence ground again energizes relay 13, which is de-energized by relay 14 after precisely the same time interval as hereinbefore explained for the negative excursion 82. This small stepwise movement of the recorder chart, synchronized as it is with the concurrent pen movement induced by memory 54, produces a very clear compact reading of spaced successive peaks 83 having the form of traces resembling triangles of very small vertex angle, as seen in FIG. 5(D).

It sometimes happens that elution rate varies unpredictably, as when a relatively low viscosity or high volatility gas absorbent is used in the chromatographic separation column 100. Since the time sequence of recording must be at least approximately co-ordinated with the analysis cycle, to a degree the criticality of which depends on the permissible excess length of programmer chart slot overlap of peak perception by the concentration detector, it is desirable to maintain an accommodation of analyzer operation wth programmer scheduling. This can be done by regulating the instantaneous rate of elution stripping by a programmed cycle step. Preferably, a single component which occurs in a concentration giving a well-defined peak, such as that represented by Peak 3, FIG. 5(A), is best for the purposes. The programmer chart is then provided with a slot overlying the time interval from points 70 to 71, FIG. 5(A), in a channel designated "Lower Flow," because, if the peak occurs within region 70–71 it is ahead of where it should be and a reduction in flow of carrier gas, with corresponding reduction in elution rate, is the appropriate corrective action required. The "Lower Flow" channel has reserved to it contact finger 24 in circuit with relay 3, operative, when energized, to close contact 3a to thereby close carrier gas valve 18 a single step during the time interval in which contacts 3a and 12a are concurrently in closed circuit with valve 18, contacts 12a being actuated by energization by relay 12 responsive to peak detector 53.

The energy to actuate the solenoid of valve 18 (not detailed) is provided by the capacitor 138, typically, 1500 μf., connected on one side to ground, which is charged through resistor 139, typically, 1500 ohms, connected to +24 v. D.-C. via lead 145. Thus, the pulse of current required to actuate the valve solenoid is obtained while simultaneously temporarily depleting the source of energy. This latter action is desirable to prevent false valve operation during the operations hereinafter described.

Similarly, the programmer chart is provided with a slot overlying the time interval 72–73, FIG. 5(A), in a "Raise Flow" channel, the electrical circuit of which incorporates contact finger 25 and relay 4. Thus, if the peak sensed by peak detector 53 falls within the time 72–73, during which spring-loaded relay contact 4a occupies its lower position responsive to energization of relay 4, then relay 12, which is activated by the peak occurrence and remains activated until the signal returns to zero, maintains its contact 12a closed at least part of the time interval during which relay contact 4a is also closed. Carrier gas valve 18 is thereupon opened a single step by an electrical impulse transmitted via lead 145, thereby increasing the carrier gas flow rate and, consequently, the elution rate. In the unlikely event that a single actuation of the carrier gas valve is inadequate to effect synchronization, an additional actuation will occur during the next-following analysis cycle. Obviously, no flow alteration is indicated if time interval 71–72 is synchronized in occurrence with the peak selected as the time-synchronizing reference, and this can be considered the permissible tolerance in elution-time variation angularly separating the "Lower Flow" and "Raise Flow" slots of programmer chart 130. It should be mentioned that, if the peak occurs in the time interval 71–72, capacitor 138 is discharged via the series-connected upper relay contacts 3a and 4a, shown in their normal position in FIG. 1A connected to ground through resistor 140, typically, 100 ohms. Thus, even though the peak-detector relay 12 is still energized during the return to zero of a concentration detector signal whose peak value occurred prior to energization of relay 4, and accompanied transfer of relay contact 4a to its lower position, insufficient energy will be stored in capacitor 138 to actuate the valve solenoid. By this means it is assured that valve actuation will result only if the peak detector relay 12 actuation overlaps, but never precedes, the independent transfer of either relay contacts 3a or 4a, as the case may be.

The apparatus as so far described is completely operable and self-sufficient as an analyzer controller; however, it is usually desirable to provide auxiliary apparatus for the trend recording of one or more individual components in the mode depicted in FIG. 5(E). The additional apparatus required for the trend recording of a single component is shown schematically within the broken-line enclosure denoted "Trend Recorder," FIG. 1C. As shown in FIG. 5(E), an analysis cycle for a single component can be considerably reduced in chart travel extent over that required for the multi-component bar-graph recording of FIG. 5(D); however, the primary advantage is the segregation of each component in its own separate record.

Conveniently the trend auxiliary can employ the switching hereinbefore described for bar-graph mode recording, a circuit connection 91 with the contact 1c constituting the homing lead for stepping switch drive 16, whereas a similar connection 92 terminating in a lower contact 2c position is the stepping connection. Interlocked operation under control of peak detector 53 is provided by connecting, through normally open contact 12b, branched from connection 92, an R-C circuit consisting of parallel-connected capacitor 60 (typically, 0.1 mfd.) and resistor 61 (typically, 1 megohm), thence via the switch arm of stepping switch 16b to relay coil 15 and ground. Memory 54 is connected to the switch arm of stepping switch 16a through lead 93, and the switch arms of both stepping switches are ganged for simultaneous positioning as indicated by the broken-line connection between them jointly and stepping switch drive 16.

In operation, the sampling step which energizes relay 1 at the beginning of each analysis cycle closes contact 1c, which actuates stepping switch drive 16 to home position by establishment of the power circuit through connection 91 during this time interval. Thereafter, the occurrence of each individual "read" step in turn, indexes the stepping switches in concert, one step at a time, as a result of each successive transfer of contact 2c to its lower position during each "read" step. The individual positions of stepping switch 16a are singly reserved to the recording of the composition of one particular component, utilizing a specific memory 62 for each connected to the stepping switch 16a contact through a relay contact 15a, only the first such trend recorder being detailed. Each component also has rserved to it its own recorder/ controller 65, or, alternatively, a reserved point of a multi-point recorder. A potentiometer 63 (typically of 100,000 ohms span), having tap 64, is interposed between memory 62 and recorder 65 to permit selection of any convenient recorder span independent of the magnitude of peak electrical equivalent stored in memory 62. During the "read" step, peak detector 53 builds up to the individual peak being read and then energizes relay 12, which closes contact 12b and, contact 2c being at this instant in its lower position, current flows momentarily through relay coil 15 during the charging of capacitor 60. Contact 15a is thus closed, transferring the electrical equivalent for the specific component from the general memory 54 to the reserved memory 62 via leads 54b and 93 and the switch arm of 16a, where it is stored until the next analysis cycle. Capacitor 60 in the meantime discharges through resistor 61 anticipatory of its next operating cycle.

As seen in FIG. 5(E), trend recording consists of a succession of short-interval tracings, each at a unique ordinate level corresponding to the potential level existing at the time in memory 62, which, end-to-end, present a stair step appearance.

The following operational trials were made with the apparatus of this invention to determine comparative performance as opposed to commercially available apparatus as the standard of the art. It should be mentioned that commercially available apparatus generally possesses some excessive dead volume contributed by the sampling valve and the piping between the valve and the column and, moreover, the detector response is sometimes slower in commercial equipment than in the well-designed accessory-fitted, advanced design apparatus with which this invention was associated during the tests reported in the examples. Nevertheless, this in no way favors the invention, because its operation must accommodate the chromatographic column in any case and any enhanced speed of operation of the latter imposes even more severe demands on the read-out apparatus teamed with it.

To illustrate the degree of resolution, speed, and concentration determined obtainable with a high performance chromatographic analyzer, designed in accordance with the best known principles, the illustrative chromatograms in FIGURES 6–11 were recorded in the continuous mode with a high-speed laboratory-type Sanborn 320 recorder, except where otherwise noted. The chromatograms could equally well be recorded in bar-graph form on a 1-sec. full-scale conventional recorder as typified by FIG. 12B, taking advantage of the memory feature of the present invention.

*Example I*

A column 100 consisting of a 1-meter long, 3/16" bore stainless steel U-tube was employed as the chromatographic separator, utilizing 100–120 mesh Chromosorb P containing 10% Dow Corning silicone oil as the absorbent. The sample volume was limited to 0.05 cc., since it is known that separation capability is enhanced by reduction of sample size, resolution of early peaks being particularly improved.

The sample mixture, with individual components denoted by the assigned letters, analyzed (in percent by volume): A-air 39%, B-water vapor 0.2%, C-dichlorodifluoromethane 0.8%, D-dichlorotetrafluoroethane 9%, E-dichlorofluoromethane 17%, F-trichlorofluoromethane 18% and G-trichlorotrifluoroethane 16%.

All runs were made at room temperature using the controller of this invention, and the He carrier gas average velocity was adjusted at 11 cm./sec. for optimum resolution of the early peaks.

Figure 6:
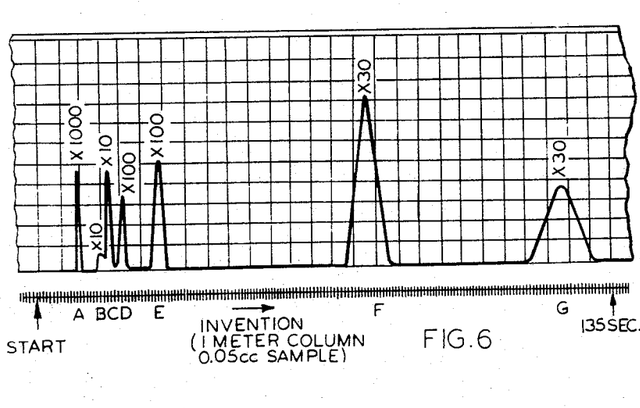
FIG. 6 is a typical chromatogram run made with a 1-meter gas chromatographic column provided with well-designed accessory apparatus and a controller according to this invention.

The chromatogram, obtained in continuous mode operation, reproduced as FIG. 6 was obtained, the signal attenuation factors for each peak being denoted by the multipliers related to each. The time scale is graduated in one-second units, the test run thus requiring about 135 secs. overall.

The identical analysis was read out with a commercial apparatus, employing a 1-meter coiled chromatographic column and a 1 cc. sample, it being necessary to use a much larger sample in order to obtain the sensitivity necessary to get any record whatever of component C. The chromatogram obtained is FIG. 7.

Figure 7:
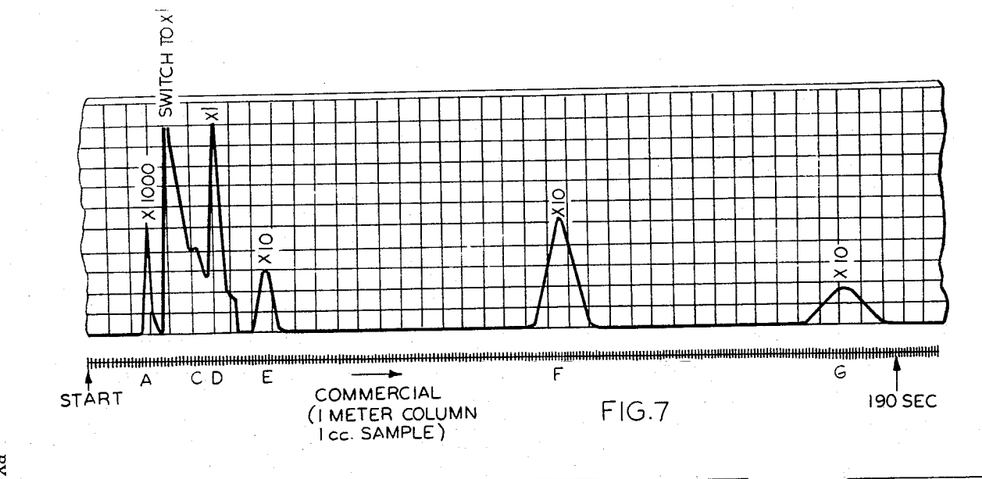
FIG. 7 is a typical chromatogram run obtained on a 1-meter gas chromatographic column and the same sample analysis as used in the FIG. 6 run, except employing a commercial high-sensitivity chromatograph instead of the apparatus of this invention.

Comparing the two chromatograms, it will be seen that peak A, FIG. 7, is severely skewed, whereas peak A, FIG. 6, is not only nearly perfectly symmetrical but is only about one third as wide, thereby obviating interference with subsequent peaks. Peak B is entirely absent from FIG. 7, the elevation accompanying the switch to X1 attenuation being the so-called "tail end" of A, whereas B is clearly present in FIG. 6, even though the latter was attenuated by a factor of 10 and, also, even though the sample in analysis was only one twentieth as large. Peaks C, D and E are substantially narrower in FIG. 6, than their counterparts of FIG. 7, which is advantageous. The reason for this is that the sensitivity of the read-out is proportional to the area under each peak, and the narrower the peak is the greater will be its height, thereby making it easier to measure a given component concentration. Finally, the elapsed time of 135 secs. for the FIG. 6 run made with the apparatus of this invention is appreciably less than the 190 secs. required to obtain the chromatogram of FIG. 7.

Figure 8:
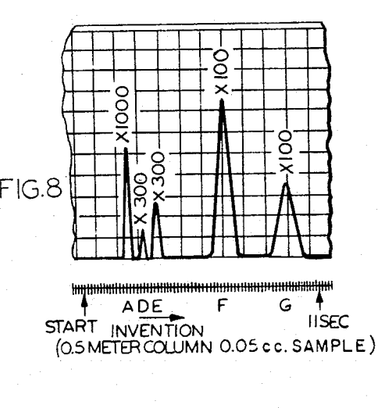
FIG. 8 is a typical chromatogram run made with a ½-meter gas chromatographic column provided with well-designed accessory apparatus and a controller according to this invention, analyzing the same sample composition as the FIGS. 6 and 7 runs.

Sometimes resolution can be sacrificed if the speed of analysis is coincidentally markedly improved, and the run with the chromatogram of FIG. 8, using the same sample composition as employed for the analyses of FIGS. 6 and 7, was an attempt at very high speed analysis (within a span of only about 11 seconds) using a 0.5 meter length column, the apparatus of this invention, a laboratory-type recorder and a 0.05 cc. sample. Here the resolution is definitely superior to that of the FIG. 7 run on commercial equipment, even though resolution fine enough to reveal component C was not achieved. The shortened column resulted in a 3-fold increase in signal amplitudes, as revealed by the increased attenuation factors employed. Moreover, since the first three peaks occurred at signal widths only a fraction of a second in extent, bar-graph recording with an industrial-type recorder would clearly be impossible without the memory element of this invention.

*Example II*

The improved resolution obtainable with this invention as compared with prior art apparatus is further demonstrated by this example, in which the sample analyzed consisted of the following numbered components (in percent by volume): (1) propane 37%, (2) iso-butane 16%, (3) n-butane 45% and (4) iso-pentane 2%.

The chromatographic column packing for all runs was 100–120 mesh Chromosorb P to which 10% by weight of di-2-ethyl hexyl sebacate was added. The carrier gas was helium.

An equipment manufacturer, in demonstrating the performance capability of its apparatus for sales purposes, analyzed the sample composition hereinabove reported with its proprietary design of commercial "high-speed" instrument. The column length selected was 2 meters, in order to obtain acceptable resolution, and, while the attenuation was not explicitly disclosed, it was approximately X30. The analysis required 40 secs., during which the chromatogram of FIG. 9 was obtained.

Using this invention, it was possible to reduce the column length to 0.5 meter, the chromatogram of FIG. 10 being obtained, as to which the analysis time was only 31 secs.

It is particularly significant that two impurities (probably methane and ethane) were found to occur ahead of the propane peak (No. 1) in FIG. 10. The concentrations of these are in the parts-per-million range, and the commercial apparatus was unable to even hint at their presence, as refer FIG. 9.

By way of furthering the comparison, it was assumed arbitrarily that the resolution achieved by the commercial read-out apparatus might, in given circumstances, be acceptable, provided that enough enhancement in analysis speed could be co-incidentally realized. Accordingly, the same ½ meter column was used with an increased carrier gas average velocity of 22 cm./sec. as compared with 10 cm./sec. for the FIG. 10 run. The chromatogram shown in FIG. 11 was obtained in this very high speed run, which required only 14 secs. cycle time. [Due to the small scale of FIG. 11, attenuation factors are not drawn in; however, they were identical with those of FIG. 10 as regards components 1–4, whereas the two peaks preceding Peak 1 were attenuated by X3.] It will be seen that comparable resolution was achieved as for the 31 sec. run of FIG. 10, except that one of the two impurities, methane or ethane, not revealed at all by the commercial apparatus in the FIG. 9 run, came through only faintly, although it was still recognizable. This afforded convincing evidence, that the read-out apparatus of this invention was, indeed, well-suited to very high-speed operation, while still retaining resolution decidedly superior to that achieved by the best available apparatus of the prior art.

*Example III*

The capability of this invention in accommodating read-out with the response of a slow recorder is demonstrated by this example.

Here the sample employed contained nine different components, with peaks numbered in the sequence recited on each of the chromatograms obtained, as follows: (1) air 3 p.p.m., X1 (2) water, 3 p.p.m., X1 (3) dichlorodifluoromethane 12 p.p.m., X1 (4) dichlorotetrafluoroethane 6 p.p.m., X1 (5) dichlorofluoromethane 60 p.p.m., X3 (6) trichlorofluoromethane 99+%, X10,000 (7) chloroform 15 p.p.m., X1 (8) unknown 8 p.p.m., X1 and (9) carbon tetrachloride 160 p.p.m., X1.

Figure 12A:
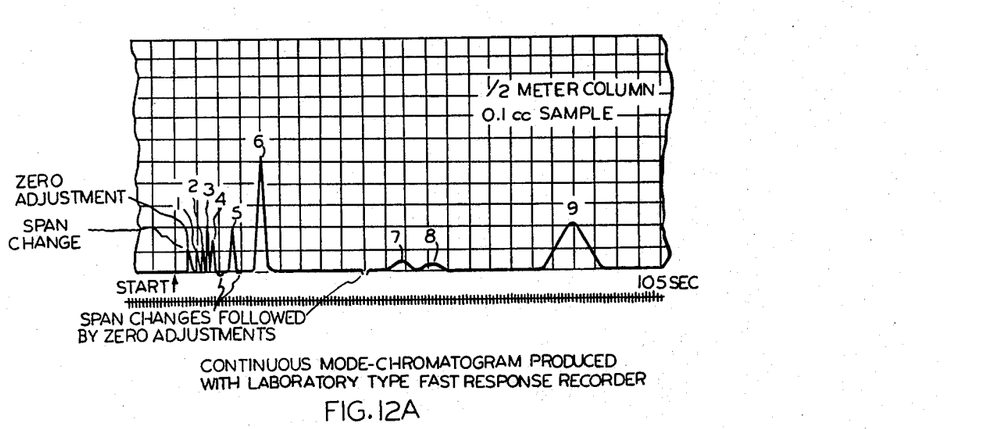

The chromatogram of FIG. 12A was in the continuous mode, employing a laboratory-type, fast response recorder, a 0.5 meter length column and a 0.1 cc. sample. The apparatus was then switched to bar-graph recording, thereby obtaining the chromatogram of FIG. 12B for the same composition sample-column combination, wherein the numbered ordinate axis is in terms of percent full scale.

Figures 2, 12B:
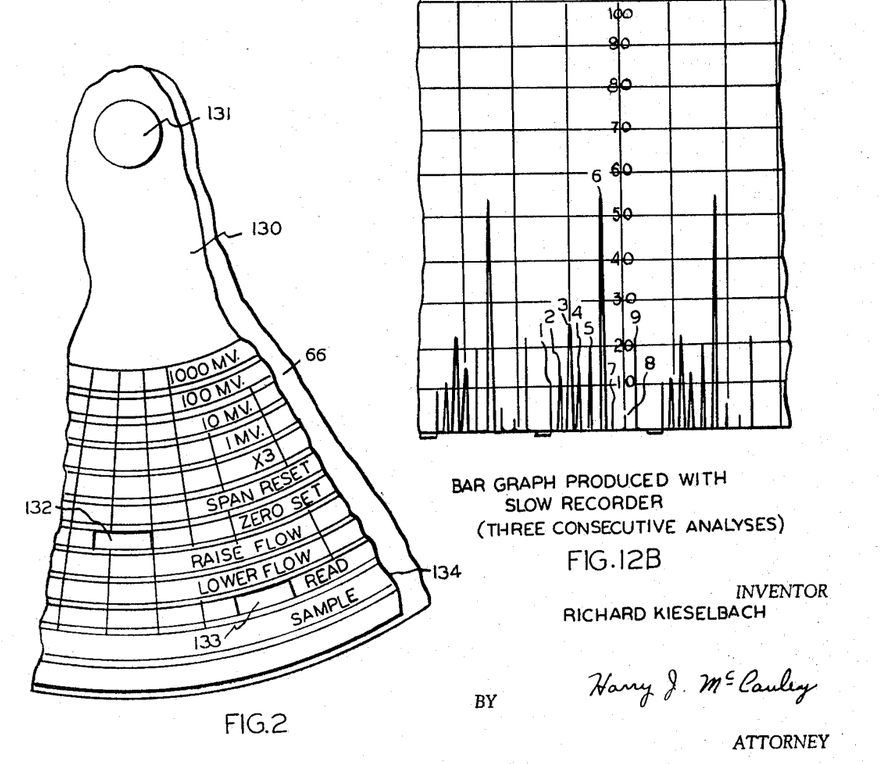
FIG. 2 is a fragmentary plan view of a programming chart mounted on its rotary driving hub, used in the apparatus of FIGS. 1A–1C.
FIG. 12A is a continuous mode read-out made with a laboratory-type fast response recorder and FIG. 12B is a bar-graph read-out made with a slow response industrial type recorder.

A comparison of FIG. 12B with FIG. 12A shows the complete agreement as to the proportionate relationship of all nine of the components one with another, demonstrating the efficacy of memory 54 in operation.

From the foregoing, it will be understood that this invention can be modified in numerous respects within the skill of the art without departure from its essential spirit, and it is accordingly intended to be limited only by the scope of the appended claims.

What is claimed is:

1. A control apparatus for a chromatographic analyzer provided with means for regulating elution rates comprising, in combination, an analysis programming device effectuating the sample chromatographic analysis cycle in progression from sample input through elution stripping of segregated components, an electrical read-out circuit responsive to the column effluent concentration detector of said chromatographic analyzer having, in series connection with said concentration detector, a signal span selection network, a voltage amplifier, a peak detector and a peak waveform recorder parallel-connected with said peak detector, and means responsive to said peak detector superposing application by said programming device of a programmed corrective action regulating the rate of said elution stripping to maintain disposition of a chosen analysis peak as time-synchronizing reference within predetermined time bounds with respect to the operational cycle of said electrical read-out circuit.

2. A control apparatus for a chromatographic analyzer according to claim 1 wherein said programming device is provided with means adjusting said signal span selection network to a specific programmed setting of appropriate signal span magnitude prior to analysis for a given component in said sample.

3. A control apparatus for a chromatographic analyzer provided with means for regulating elution rates comprising, in combination, an analysis programming device effectuating the sample chromatographic analysis cycle in progression from sample input through elution stripping of segregated components, an electrical read-out circuit responsive to the column effluent concentration detector of said chromatographic analyzer having, in series connection with said concentration detector, a signal span selection network, a voltage amplifier and, in parallel connection one with another, a peak detector, a peak memory device and a peak waveform recorder, means for selectively switching said peak waveform recorder into series electrical circuit with one of the pair consisting of said voltage amplifier and said peak memory device, and means responsive to said peak detector superposing application by said programming device of a programmed corrective action regulating the rate of said elution stripping to maintain disposition of a chosen analysis peak as time-synchronizing reference within predetermined time bounds with respect to the operational cycle of said electrical read-out circuit.

4. A control apparatus for a chromatographic analyzer according to claim 3 provided with a trend recorder connected in the output circuit of said peak memory device and responsive to said peak detector, tracing a record of given component content within a succession of samples routed through said chromatographic analyzer.

References Cited by the Examiner

UNITED STATES PATENTS

| | | | |
|---|---|---|---|
| 3,101,606 | 8/1963 | Roof | 73—23.1 |
| 3,206,968 | 9/1965 | Leggoe et al. | 73—23.1 |
| 3,247,707 | 4/1966 | Burk | 73—23.1 |

OTHER REFERENCES

Dimbat, M. et al.: "Gas Chromatography," in Analytical Chemistry, 28(3): pages 290–297, March, 1956.

Darling, D. J. et al.: "Automatic Range Changer for Beckman GC–2 Gas Chromatographs," in Analytical Chemistry, 32(1): page 144, Jan., 1960.

RICHARD C. QUEISSER, *Primary Examiner.*